United States Patent [19]

Kaminaga

[11] Patent Number: 4,882,732
[45] Date of Patent: Nov. 21, 1989

[54] METHOD AND APPARATUS FOR RECORDING AND/OR REPRODUCING DIGITAL DATA

[75] Inventor: Kouzou Kaminaga, Kanagawa, Japan

[73] Assignee: Sony Corporation, Tokyo, Japan

[21] Appl. No.: 116,208

[22] Filed: Nov. 3, 1987

[30] Foreign Application Priority Data

Nov. 5, 1986 [JP] Japan ................... 61-263021

[51] Int. Cl.$^4$ ............................. G06F 11/10
[52] U.S. Cl. ..................... 371/2.2; 360/38.1; 360/53; 371/40.1
[58] Field of Search ............ 360/53, 40, 47, 48, 360/38.1; 371/38, 39, 40, 41, 42

[56] References Cited

U.S. PATENT DOCUMENTS

| | | | |
|---|---|---|---|
| 4,211,997 | 7/1980 | Rudnick et al. | 360/53 |
| 4,282,551 | 8/1981 | Kanazawa et al. | 360/53 |
| 4,375,101 | 2/1983 | Cerracchio | 360/53 |
| 4,398,292 | 8/1983 | Doi et al. | 371/39 |
| 4,637,023 | 1/1987 | Lounsbury et al. | 371/38 |
| 4,680,763 | 7/1987 | Suma et al. | 371/37 |
| 4,726,028 | 2/1988 | Himeno | 371/37 |

FOREIGN PATENT DOCUMENTS

| | | |
|---|---|---|
| 0140381 | 5/1985 | European Pat. Off. . |
| 0150811 | 8/1985 | European Pat. Off. . |
| 0173900 | 3/1986 | European Pat. Off. . |
| 0191410 | 8/1986 | European Pat. Off. . |
| 0198702 | 10/1986 | European Pat. Off. . |
| 55-25812 | 2/1980 | Japan ................. 360/53 |

*Primary Examiner*—A. D. Pellinen
*Assistant Examiner*—Geoffrey S. Evans
*Attorney, Agent, or Firm*—Lewis H. Eslinger; Jay H. Maioli; Donald S. Dowden

[57] ABSTRACT

In apparatus for recording and/or reproducing digital data, digital data such as video data is encoded with error correction codes including outer codes and inner codes so that respective predetermined numbers of symbols form respective blocks to be added with synchronizing data and so on, then recorded with rotary heads on slant tracks of a tape medium such as a magnetic tape. The redundancy symbols of the outer error correction code followed by the information data and inner error correction code are recorded at the beginning of each track, so that even if the data reproduced from the beginning portion of the tape contains error, the information data is not much influenced by that error.

8 Claims, 5 Drawing Sheets

METHOD AND APPARATUS FOR RECORDING AND/OR REPRODUCING DIGITAL DATA

BACKGROUND OF THE INVENTION

1. Field of the Invention

This invention relates generally to a method and apparatus for recording and/or reproducing digital data on/from slant tracks of a tape recoding medium and, more particularly, is directed to a method and apparatus for recording and/or reproducing digital data with error correction codes.

2. Description of the Prior Art

A digital video tape recorder (VTR) in which a video signal is recorded on and reproduced from slant tracks of a magnetic tape is known and one of recording formats of the digital VTR is disclosed in Japanese laid open patent publication No. 40573/85. In such digital VTR, each field of a television signal is analog-to-digital converted and the digital data is recorded on four consecutive slant tracks of the magnetic tape.

First redundancy symbols each of eight bits for an outer error correction code are generated from a first predetermined number of symbols each of eight bits and constitute an outer error correction block together with the first predetermined number of symbols. Second redundancy symbols each of eight bits for an inner error correction code are generated from a second predetermined number of symbols which are taken from the shuffled symbols in the outer error correction code blocks and constitute an inner error correction block together with the second predetermined number of symbols.

In the beginning portion of the slant track where the reproducing head starts tracing the track, the reproducing signal is not obtained reliably so that digital data is not extracted with complete accuracy and may in fact contain many errors. Specifically, in special reproducing modes such as operation with track jumping by a dymamic tracking head, the reproducing head traces every several tracks intermittently, so that relatively long burst errors occur in the reproduced data, the length of which exceeds the error correction ability of the inner code and outer code. Such errors remain uncorrected.

OBJECTS AND SUMMARY OF THE INVENTION

Accordingly, it is an object of this invention to provide an improved method and apparatus for recording and/or reproducing digital data, and which can avoid the above described disadvantages of the prior art.

More specifically, it is an object of this invention to provide a method and apparatus for recording and/or reproducing digital data, which can reduce the number of erroneous symbols contained in information data even if much erroneous data is included in the reproduced data.

According to a first aspect of the present invention, a method of recording digital data comprises the steps of receiving a series of digital data; dividing said series of digital data into respective blocks each including a first predetermined number of data symbols; generating an outer error correction code block including said first predetermined number of data symbols and a second predetermined number of redundancy symbols; generating inner an error correction code block including a third predetermined number of data symbols and a fourth predetermined number of redundancy symbols; and recording said series of digital data with said redundancy symbols of said outer error correction code block and inner error correction code block on slant tracks of a tape recoding medium, whereby said redundancy symbols of said outer error correction code block are recorded first and are followed by said data symbols and said redundancy symbols of said inner error correction code block on the slant tracks.

According to a second aspect of the present invention, apparatus for recording digital data comprises a circuit for receiving a series of digital data; a circuit for dividing the series of digital data into respective blocks each including a first predetermined number of data symbols; a circuit for generating an outer error correction code block including the first predetermined number of data symbols and a second predetermined number of redundancy symbols; a circuit for generating an inner error correction code block including a third predetrmined number of data symbols and a fourth predetermined number of redundancy symbols; a circuit for recording the series of digital data with the redundancy symbols of the outer error correction code block and inner error correction code block on slant tracks of a tape recoding medium, whereby the redundancy symbols of the outer error correction code block are recorded first and are followed by the data symbols and the redundancy symbols of the inner error correction code block on the slant tracks.

According to a third aspect of the present invention, a method of reproducing from slant tracks of a tape recording medium digital data comprises the steps of reproducing a series of digital data with redundancy symbols of an outer error correction code block and an inner error correction code block, whereby said redundancy symbols are generated in such a manner that said series of digital data is divided into respective blocks each including a first predetermined number of data symbols, said outer error correction code block is generated so as to include said first predetermined number of data symbols and a second predetermined number of said redundancy symbols and said inner error correction code block is generated so as to include a third predetermined number of data symbols and a fourth predetermined number of said redundancy symbols and whereby said redundancy symbols of said outer error correction code block are reproduced first and are followed by said data symbols and said redundancy symbols of said inner error correction code block; decoding said inner error correction code block including said third predetermined number of data symbols and said fourth predetermined number of redundancy symbols; tagging an error flag if a predetermined number of error symbols exist in said inner error correction code block; decoding said outer error correction code block including said first predetermined number of data symbols and said second predetermined number of redundancy symbols with said error flag; and outputting said series of digital data;

According to a fourth aspect of the present invention, apparatus for reproducing from slant tracks of a tape recording medium digital data comprises a circuit for reproducing a series of digital data with redundancy symbols of an outer error correction code block and an inner error correction code block, whereby said redundancy symbols are generated in such a manner that said series of digital data is divided into respective blocks each including a first predetermined number of data symbols, said outer error correction code block is generated so as to include said first predetermined number of data symbols and a second predetermined number of said redundancy symbols and said inner error correction code block is generated so as to include a third predetermined number of data symbols and a fourth predetermined number of said redundancy symbols and whereby said redundancy symbols of said outer error correction code block are reproduced first and are followed by said data symbols and said redundancy symbols of said inner error correction code block; a circuit for decoding said inner error correction code block including said third predetermined number of data symbols and said fourth predetermined number of redundancy symbols; a circuit for tagging an error flag if predetermined number of error symbols exist in said inner error correction code block; a circuit for decoding said outer error correction code block including said first predetermined number of data symbols and said second predetermined number of redundancy symbols with said error flag; and circuit for outputting said series of digital data.

The above, and other objects, features and advantages of the invention will be apparent in the following detailed description of preferred embodiments, particularly when the same is read in conjunction with the accompanying drawings in which the same reference numerals are employed to identify corresponding elements and parts.

DETAILED DESCRIPTION OF THE PREFERRED EMBODIMENTS

An apparatus for recording and reproducing digital data according to the present invention will be hereinafter described as applied to a video recording system of a so-called digital video tape recorder which is hereinafter simply referred to as a digital VTR.

Figure 1:
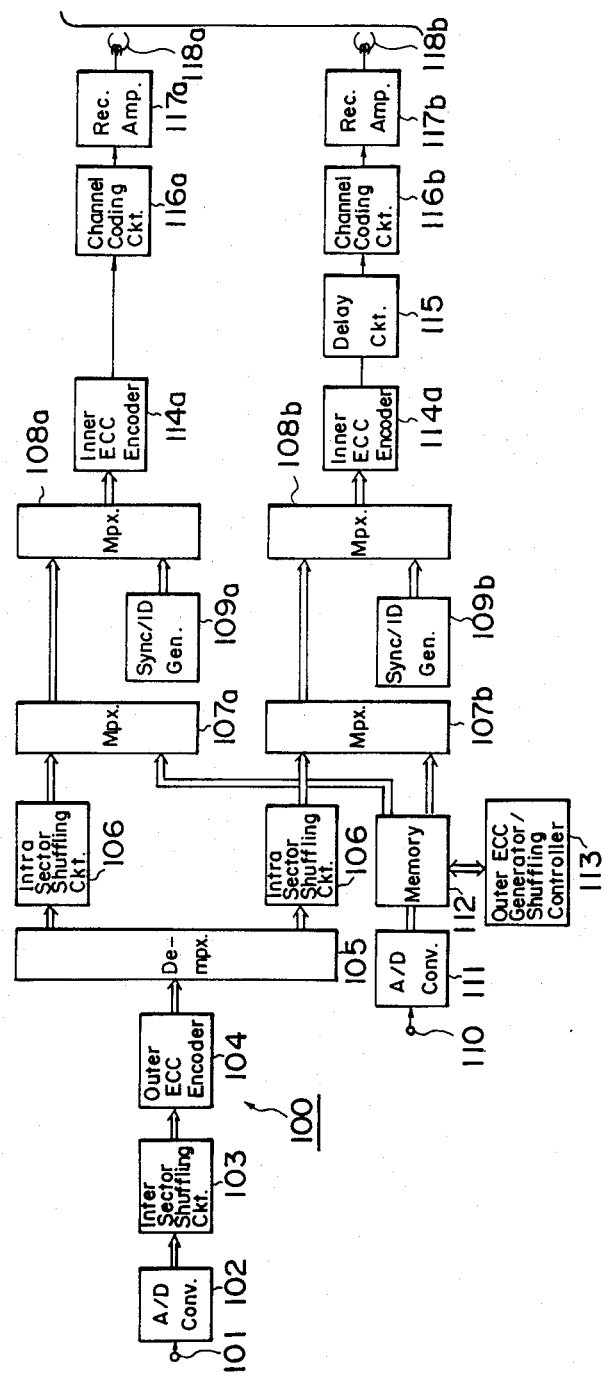
FIG. 1 is a schematic block diagram showing a recording system of a digital video tape recorder of a type to which the present invention is desirably applied.
Figure 2A:
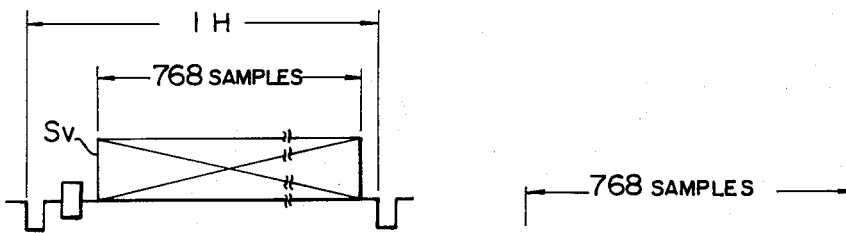
FIGS. 2A to 2C are schematic diagrams showing one example of an inter sector shuffling before outer error correction blocks are formed from a video signal in the inter sector shuffling circuit in the recording system of FIG. 1.

Referring to FIG. 1, it will be seen that a video recording system 100 of a digital VTR to which the present invention is applied includes a video signal input terminal 101 which receives a composite video signal $S_v$ having 255 lines in each field in an analog form as shown in FIG. 2A. Such composite video signal is supplied from the terminal 101 to an analog-to-digital (A/D) converter 102 in which it is converted, for example, into 8-bit symbols at a predetermined sampling frequency, for example, a sampling frequency $4f_{sc}$ which is four times color sub-carrier frequency $f_{sc}$. In the case of a color television signal according to the NTSC system, 768 effective samples are provided for each horizontal period or line as shown in FIG. 2A.

Figure 2B:
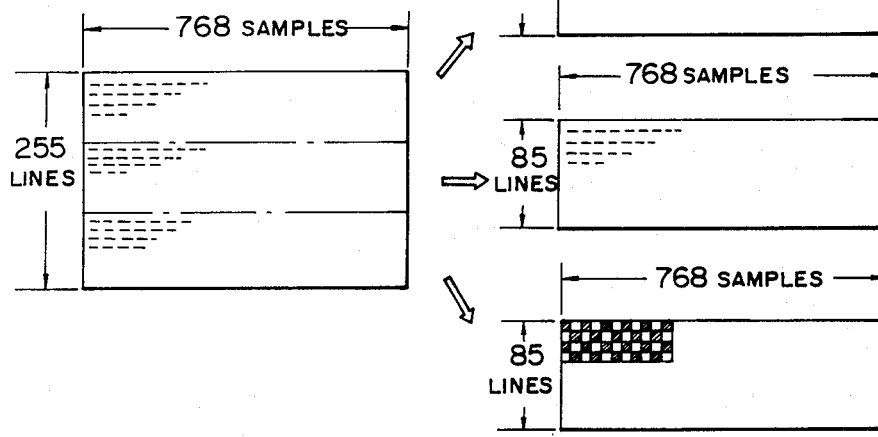
Figure 2C:
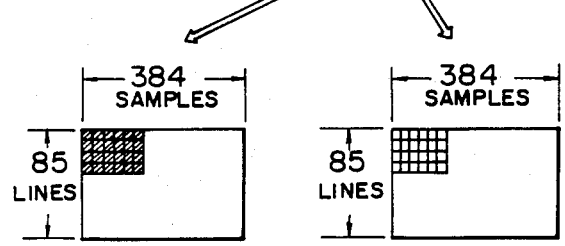

The digitized data from the A/D converter 102 is supplied to an inter sector shuffling circuit 103 in which the sampled data for each field is sequentially divided into three segments in the vertical direction of the field with the result that each segment contains the data for 85 lines each including 768 pixels, or 65,280 samples as shown in FIG. 2B. Further, the data of each segment are scattered over two sectors, channel 0 and channel 1, in such a manner that the sample data are alternately distributed in the two sectors each including the data for 85 lines each including 384 pixels, or 32,640 samples as shown in FIG. 2C. Further, in the inter sector shuffling circuit 103, the data of the first line in the respective sectors, or 384 samples, are distributed in a certain way, for example, in the first columns (Column Numbers 0, 85, 170, 255, 340, 425) of sub-arrays 0 to 5 of a matrix with an interleaving as shown in FIG. 3; and the data of the second line are distributed in another way, for example, in the second columns (Column Numbers 1, 86, 171, 256, 341, 426) of the sub-arrays with a predetermined offset starting point as shown in FIG. 3.

Figure 3:
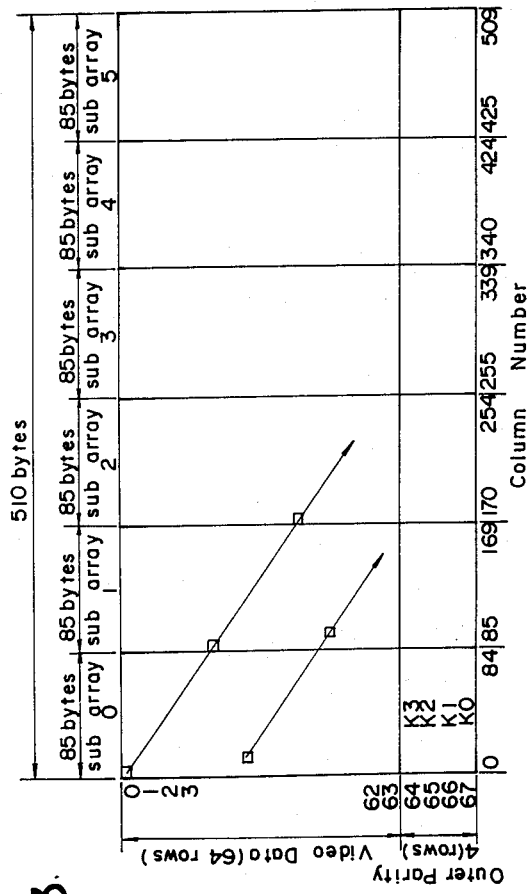
FIG. 3 is a diagrammatic view showing an arrangement of outer error correction codes from an error correction encoder and an intra sector shuffling before inner error correction blocks are formed in the intra sector shuffing circuit each included in the recording system of FIG. 1.

The data of 32,640 samples in each of the sectors thus shuffled are supplied to an outer error correction code encoder 104 in which the data in each sector are encoded into data with four parity or redundancy symbols according to the Reed-Solomon Code at every outer code block, which comprises the data of each column of the matrix, as shown in FIG. 3. The data of two sectors are handled in the circuits 103 and 104 so far.

The thus arranged outer-coded data of respective sectors are provided to a pair of intra sector shuffling circuits $106_a$ and $106_b$ through a de-multiplexer or distributor 105. The intra sector shuffling circuit 106 has a field memory and a write address generator and a read address generator, though not shown. The data of the outer code blocks are supplied to the field memory in the Column Numbers 0, 85, 170, 255, 340, 425 and so on, according to their generating order, under control of the write address generator so as to be shuffled and ideally arranged in matrix forms each of 64×510 samples as shown in FIG. 3.

The data of 32,640 samples in each of the sectors thus shuffled are read out from the field memory in the direction of the row of the matrix shown in FIG. 3 for generating the inner code blocks under control of the read address generator, whereby the outer code rows are read out first.

The shuffling process operates identically for all segments of all video fields. It is assumed that L is the television line number within a video segment: L=0, 1, ..., 84, h is the horizontal sample location within line L: h=0, 1, ..., 767, and ih is the horizontal sample index following the channel distribution process or inter sector shuffling mentioned above: ih=integer (h/2), ih=0, 1 ..., 383: where integer (x) means largest integer less than or equal to x. It is also assumed that Oblock is the outer block number within line L: Oblock=0, 1, ..., 5, and Obyt is the sample number within outer block Oblock: Obyt=0, 1, ..., 63, whereby the outer code parity symbols are not included in the intraline shuffling process. Then sample Obyt within outer block Oblock is mapped to the television screen according to the following fomula: ih=(12·L+277·Oblock+25-8·Obyt) mod 384. The outer error correction code places check redundancy symbols $K_3$, $K_2$, $K_1$, and $K_0$ in locations Obyt=64, 65, 66 and 67 respectively. The symbol at location Obyt in outer block Oblock is placed in the sector memory array at location (Row, Col) where: Row=Obyt and Col=L+85·Oblock. The sector memory array data of channel 0 is written to tape first by column order (0, 1, ..., 509) then by descending row order (67, 66, ..., 2, 1, 0). For sector memory of channel 1, the column order is the same as for channel 0 but the row order is different. It is assumed that $R_0$ and $R_1$ are the row address for the segment memory of channel 0 and channel 1 respectively, as the data is written to tape. Then $R_1$ is given by the following formula: $R_1 = (R_0+32)$ mod 64, $0 \leq R_1 \leq 63$; $= R_0$, $64 \leq R_0 \leq 67$.

The data from the intra sector shuffling circuit $106_a$ and $106_b$ is supplied to each multiplexer $107_a$ or $107_b$ for the addition thereto, in a time-sharing manner, of a digital audio data signal as described below.

The resulting multiplexed signal is supplied to each multiplexer $108_a$ or $108_b$ for the addition thereto, in a time-sharing manner, of a synchronizing (Sync.) signal and an identifying (ID) signal supplied by each synchronizing and identifying signal generating circuit $109_a$ or $109_b$.

One or more analog audio signals which are received at an audio signal input terminal 110 are supplied to an analog-to-digital (A/D) converter 111 in which it is converted, for example, into 16-bit samples at a predetermined sampling frequency, for example, of 48 kHz. The digitized data from the A/D converter 111 is supplied to a memory circuit 112 and subjected to outer error correction code encoding and shuffling under control of an outer error correction code generating and shuffling controlling circuit 113 in a similar manner as the video data. The encoded and shuffled digital audio data is supplied to the multiplexer $107_a$ or $107_b$ as described above.

Figure 4:
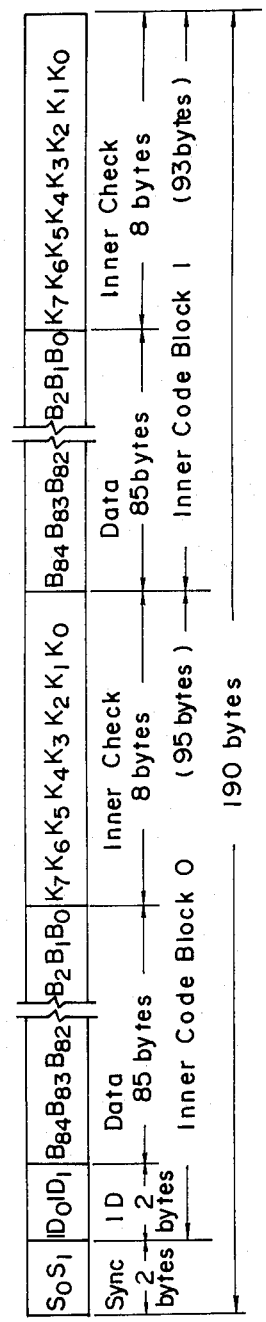
FIG. 4 is a diagrammatic view showing an arrangement of an inner error correction code from an error correction encoder also included in the recording system of FIG. 1.

The resulting multiplexed signal is supplied to each inter error correction code encoder $114_a$ or $114_b$ for encoding into synchronizing (Sync.) blocks of which one is shown in FIG. 4. More particularly, as shown in FIG. 4, each of the Sync. blocks consists of two bytes of synchronizing data $S_0$, $S_1$, a first inner code block formed of 85 bytes of data $B_0$ to $B_{84}$ added to two bytes of ID data $ID_0$, $ID_1$ and 8 bytes of inner parity check data or redundancy symbols $K_0$ to $K_7$, and a second inner code block formed of 85 bytes of data $B_0$ to $B_{84}$ to which 8 bytes of inner parity check data $K_0$ to $K_7$ are added. 204 Sync. blocks of the type illustrated by FIG. 4 constitute each video sector, and 24 Sync. blocks of the type illustrated by FIG. 4 constitute four audio sectors 0 to 3 each including 6 Sync. blocks.

Figure 5:
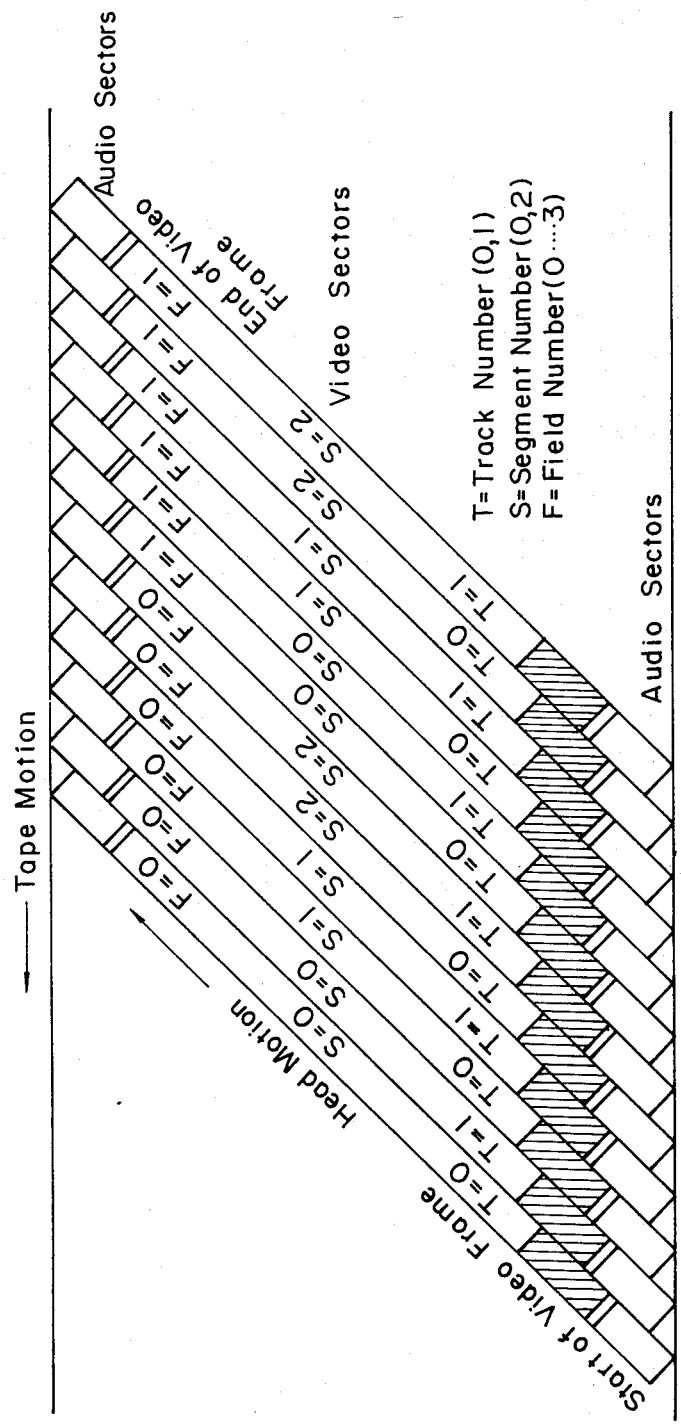
FIG. 5 is a diagrammatic view showing a pattern of tracks in which a video signal and audio signals are digitally recorded by the recording system of FIG. 1.

The thus arranged data is subjected to a code modulation, such as, that of a Modified Miller Code ($M_2$ Code), by each channel coding circuit $116_a$ or $116_b$, after the data of one of the sectors is delayed by a predetermined amount by delay circuit 115 for adjusting time delay owing to the head arrangement, and then supplied through each recording amplifier $117_a$ or $117_b$ for recording on a tape T, as shown in FIG. 5, by each of a plurality of recording heads $118_a$ and $118_b$ with azimuth angles mounted on a rotary head drum (not shown). In the format shown in FIG. 5, the data of one frame of the video signal are recorded in 12 tracks without guard band, with one video sector of 204 Sync. blocks being recorded in each track. The first 24 Sync. blocks include the redundancy symbols for the outer error correction code as shown by hatching line in FIG. 5. Accordingly, the ID signal for each Sync. block having the format shown in FIG. 4 indicates the respective Sync. block number and sector ID. The same data of the audio signal are recorded before and after one video sector of 204 Sync. blocks with edit gaps in each track so as to be recorded twice.

Figure 6:
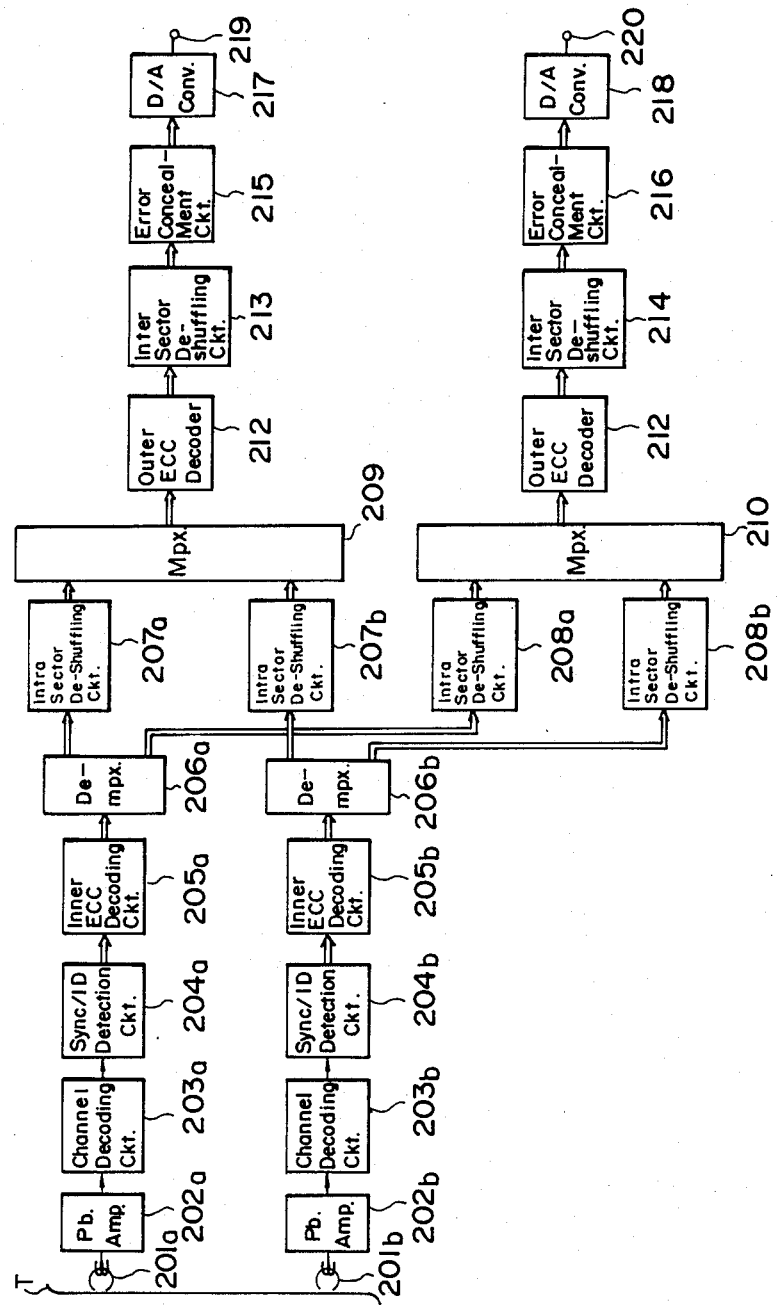
FIG. 6 is a schematic block diagram showing a reproducing system of a digital video tape recorder of a type to which the present invention is desirably applied.

Referring now to FIG. 6, it will be seen that, in a reproducing system 200 of the digital VTR to which the present invention is desirably applied, data are reproduced from the tape T by reproducing heads $201_a$ and $201_b$ and supplied therefrom through playback amplifies $202_a$ and $202_b$ to channel decoding circuits $203_a$ and $203_b$ in which the signal recording according to the Modified Miller Code is converted to a signal of an NRZ (non return to zero) modulation system and then fed to Sync. signal/ID signal detecting circuits $204_a$ and $204_b$. By means of the circuits $204_a$ and $204_b$ the Sync. signal is detected for determining the Sync. block to which the data belongs and, at the same time, the ID signal is detected for determining the following signal processing to which each sample of the data is to be subjected. More particularly, since the detected ID signal contains the sector ID and the Sync. block number in such identified sector, if the sequential order of the samples within one Sync. block is considered, it is possible to determine the absolute address of the respective samples in the Sync. block. Therefore, the Sync. signal/ID signal detecting circuits $204_a$ and $204_b$ are effective to extract the video data as well as the respective address thereof.

The data supplied from the detecting circuits $204_a$ and $204_b$ is applied to inner error correction code decoding circuits $205_a$ and $205_b$ in which it is subjected to error detection and correction processing by using the inner code parity, and any error in the respective ID signal is also detected. If an error in the data constituting the ID signal cannot be corrected, the address of data in the corresponding Sync. block is not reliable, so that data of that Sync. block is not transferred to the next stage constituting intra sector de-shuffling and time base correction circuits $207_a$, $207_b$, $208_a$ and $208_b$. On the other hand, if the ID signal is corrected but the error in the video data is not corrected, an eror flag is added to the video data and transferred therewith to the next stage or circuits $207_a$, $207_b$, $208_a$ and $208_b$.

More specifically, the data subjected to the error correction process in the inner error correction code decoding circuit 205 and the addresses of such data are supplied through de-multiplexers $206_a$ and $206_b$ to the intra sector de-shuffling and time base correction circuits $207_a$, $207_b$ for video data having a field memory and a write addres generator and a read address generator, respectively, though not shown and the intra sector de-shuffling and time base correction circuits $208_a$ and $208_b$ for audio data in which the data is de-shuffled to the data arrangement of the outer code and then supplied through multiplexers 209 and 210 to an outer error correction code decoding circuit 211 for video data and an outer error correction code decoding circuit 212 for audio data. In such decoding circuits 211 and 212, error correction processing is carried out with reference to the error flags added by the inner error correction code decoding circuits 205$_a$ and 205$_b$. Here again, if the error is not corrected fully in circuits 211 and 212, an error flag is added to the data and supplied therewith to an inter sector de-shuffling circuit 213 for video data and an inter sector de-shuffling circuit 214 for audio data in which the original data arrangement is restored. Thereafter, any uncorrected error in the data identified by the error flag added thereto is concealed or interpolated by a known concealing or interpolating technique in an error concealment circuit 215 for video data and an error concealment circuit 216 for audio data. Finally, the error-concealed or interpolated video data is converted into an analog video signal by a digital-to-analog (D/A) converter 217 and then delivered therefrom through a video signal output terminal 218 and the error-concealed or interpolated audio data is converted into one or more channels of an analog audio signal by a digital-to-analog (D/A) converter 219 and then delivered therefrom through an audio signal output terminal 220.

By way of summary, it will be appreciated that, in the described embodiment of the invention, the redundancy symbols of the outer error correction code are recorded on each track at the beginning portion of the video sector followed by the actual video data. Accordingly, even if error occurs in the digital data at the beginning portion of the video sector when the recorded signal is reproduced by reproducing heads from slant tracks so that the digital data is recovered, most of the error is included in the redundant symbols of the outer error correction code. Therefore, the erroneous symbols contained in the video or audio data can be corrected or pointed out with an error flag by the inner error correction code and the uncorrected erroneous data can be concealed in the error concealment circuit.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

What is claimed is:

1. A method of recording digital data comprising the steps of:
   receiving a series of digital data;
   dividing said series of digital data into a plurality of segments each including a first predetermined number of data symbols;
   alternately distributing the data symbols of each of said segments into two respective sectors;
   shuffling the data symbols in each sector according to a predetermined pattern;
   generating an outer error correction code block including a first predetermined number of redundancy symbols for each of said sectors;
   generating an inner error correction code block including a second predetermined number of redundancy symbols for each of said sectors; and
   recording said series of digital data with said redundancy symbols of said outer error correction code block and said inner error correction code block on slant tracks of a tape recording medium, said redundancy symbols of said outer error correction code block being recorded first, at the beginning of each of the slant tracks, and being followed by said data symbols and said redundancy symbols of said inner error correction code block on each of the slant tracks, whereby errors are more likely to affect said redundancy symbols of said outer error correction code block than other portions of said digital data and said other portions of said digital data have a reduced error rate.

2. A method of recording according to claim 1, comprising the further step, after said step of generating an outer error correction code signal, of shuffling each said sector including said first predetermined number of redundancy signals according to a second predetermined pattern.

3. A method of recording according to claim 1, comprising the further step, after said step of generating an outer error correction code signal, of multiplexing a second digital data signal with each of said sectors and respective first predetermined number of redundancy signals.

4. Apparatus for reproducing digital data comprising:
   means for reproducing from slant tracks of a tape recording medium a series of digital data with redundancy symbols of an outer error correction code block and an inner error correction code block, in which said redundancy symbols were generated in such a manner that said series of digital data was divided into segments each including a first predetermined number of data symbols and each segment was divided into two, equal sectors, each including a second predetermined number of data signals and a second predetermined number of said redundancy symbols to form said outer error correction code block and said inner error correction code block was generated so as to include a third predetermined number of data symbols and a second predetermined number of said redundancy symbols, said redundancy symbols of said outer error correction code block being reproduced first from the beginning of each slant track and being followed by said data symbols and said redundance symbols of said inner error correction code block, whereby errors are more likely to affect said redundancy symbols of said outer error correction code block than other portions of said digital data and said other portions of said digital data have a reduced error rate;
   means for decoding said inner error correction code block including said third predetermined number of data symbols and said second predetermined number of redundancy symbols for detecting and correcting errors therein;
   means for tagging an error flag if a predetermined number of error symbols exist in said inner error correction code block;
   means for decoding said outer error correction code block including said first predetermined number of data symbols and said first predetermined number of redundancy symbols with said error flag for detecting and correcting errors therein; and
   means for outputting said series of digital data.

5. A method of reproducing digital data comprising the steps of:
   reproducing from slant tracks of a tape recording medium a series of digital data with redundancy symbols of an outer error correction code block and an inner error correction code block, in which said redundancy symbols were generated in such a manner that said series of digital data was divided into segments each including a first predetermined number of data symbols and each segment was divided into two sectors, each sector including a second predetermined number of data symbols and a first predetermined number of redundancy symbols to form the outer error correction code block and said inner error correction code block was generated so as to include a third predetermined number of data symbols and a second predetermined number of redundancy symbols, said redundancy symbols of said outer error correction code block being reproduced first from the beginning of each of the slant tracks and being followed by said data symbols and said redundancy symbols of said inner error correction code block, whereby errors are more likely to affect said redundancy symbols of said outer error correction code block than other portions of said digital data and said other portions of said digital data have a reduced error rate;

decoding said inner error correction code block including said third predetermined number of data symbols and said second predetermined number of redundancy symbols for detecting and correcting errors therein;

tagging an error flag if a predetermined number of error symbols exist in said inner error correction code block;

decoding said outer error correction code block including said first predetermined number of data symbols and said first predetermined number of redundancy symbols with said error flag for detecting and correcting errors therein; and outputting said series of digital data.

6. Apparatus for recording digital data comprising:
means for receiving a series of digital data;
means for dividing said series of digital data into a plurality of segments each including a first predetermined number of data symbols;
means for alternately distributing the data of each of said segments into two sectors, respectively, and shuffling the data in each sector according to a predetermined pattern;
means for generating an outer error correction code block including a first predetermined number of redundancy symbols for each of said sectors;
means for generating an inner error correction code block including a second predetermined number of data symbols and a second predetermined number of redundancy symbols for each of said sectors; and
means for recording said series of digital data with said redundancy symbols of said outer error correction code block and said inner error correction code block on slant tracks of a tape recording medium, said redundancy symbols of said outer error correction code block being recorded first, at the beginning of each of said slant tracks, and being followed by said data symbols and said redundancy symbols of said inner error correction code block on the slant tracks, whereby errors are more likely to affect said redundancy symbols of said outer error correction code block than other portions of said digital data and said other portions of said digital data have a reduced error rate.

7. Apparatus for recording according to claim 6, further comprising means for shuffling each said sector including an outer error correction code block according to a second predetermined pattern.

8. Apparatus for recording according to claim 6, in which a second digital data signal is provided for recording and further comprising multiplexer means receiving each said sector including a respective outer error correction code block for multiplexing therewith the second digital data signal, the multiplexed result being fed to said means for generating an inner error correction code block.

* * * * *

UNITED STATES PATENT AND TRADEMARK OFFICE
CERTIFICATE OF CORRECTION

PATENT NO. : 4,882,732
DATED : November 21, 1989
INVENTOR(S) : Kouzou Kaminaga It is certified that error appears in the above-identified patent and that said Letters Patent is hereby corrected as shown below:

Col. 1, line 67, change "inner an" to -- an inner --

Col. 2, line 20, change "predetrmined" to -- predetermined --

Col. 6, line 18, change "amplifies" to -- amplifiers --

<u>In Claims</u>:

Col. 8, line 40, change "redundance" to -- redundancy --

Signed and Sealed this

Fourth Day of December, 1990

*Attest:*

HARRY F. MANBECK, JR.

*Attesting Officer*     *Commissioner of Patents and Trademarks*